Feb. 12, 1924.

W. N. STEVENS 1,483,203

AUTOMATIC TABLE INDEXING AND LOCKING MECHANISM

Original Filed Aug. 26, 1921  5 Sheets-Sheet 1

Witness:
A. J. Sauser.

Inventor:
William N. Stevens,
By Samuel N. Ford
Atty.

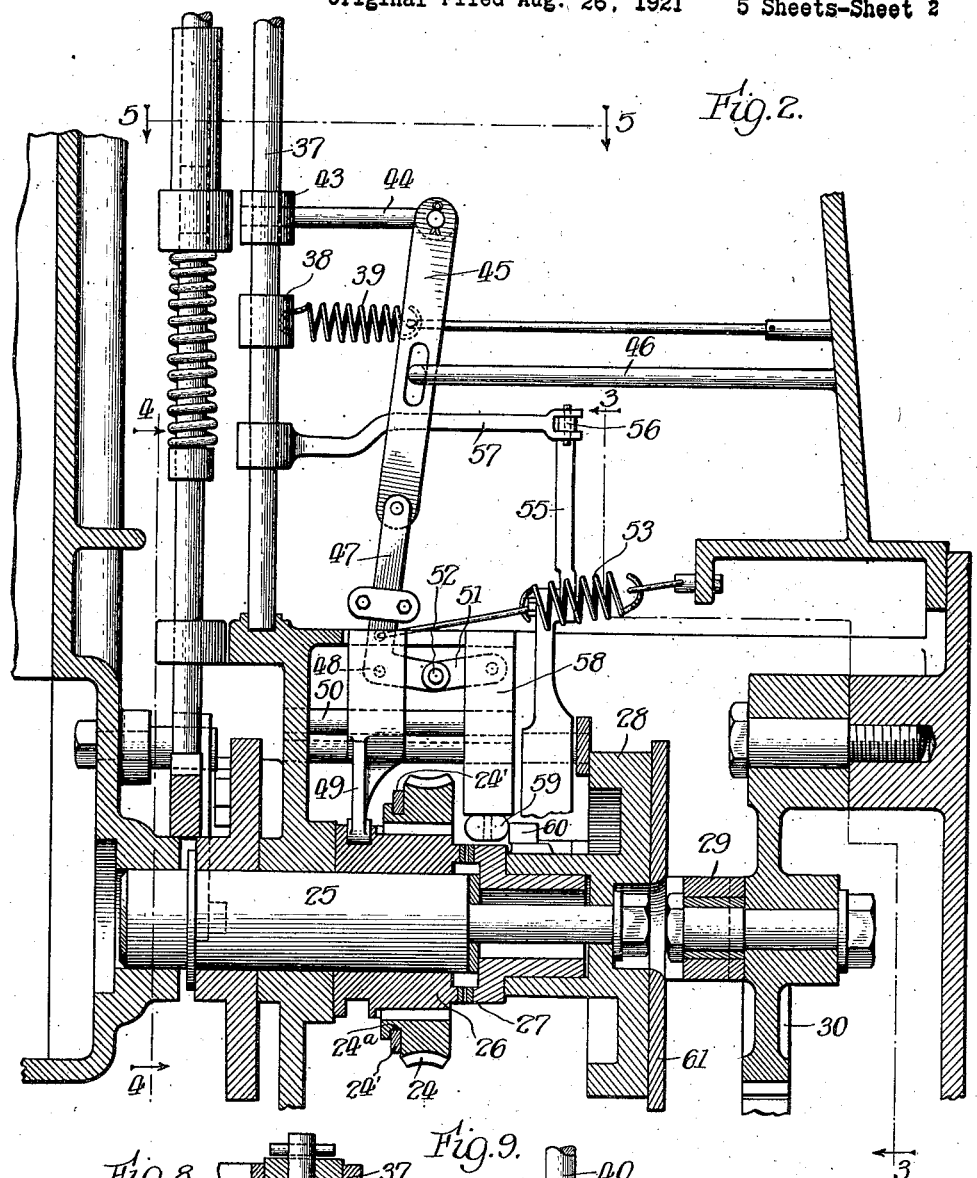

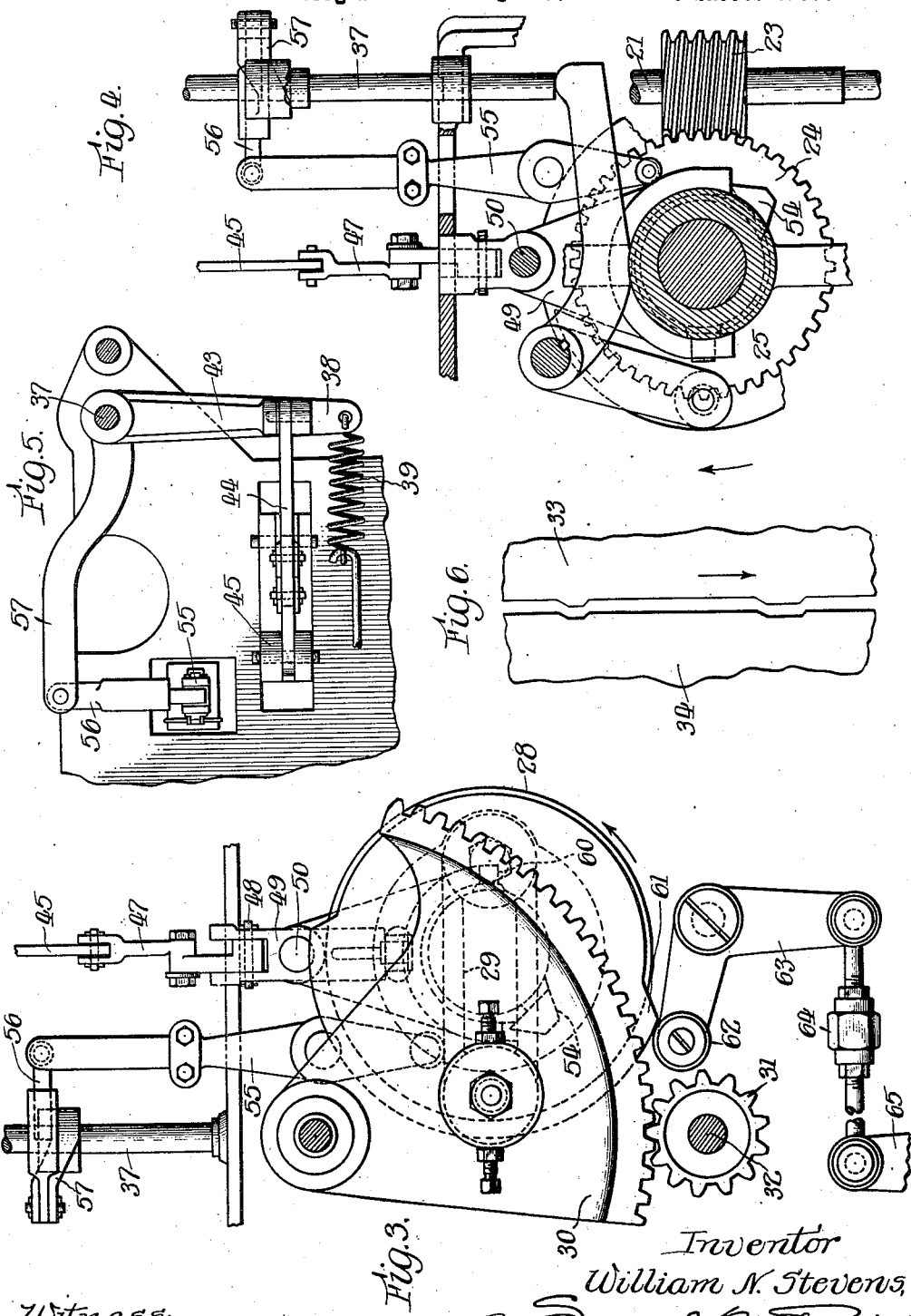

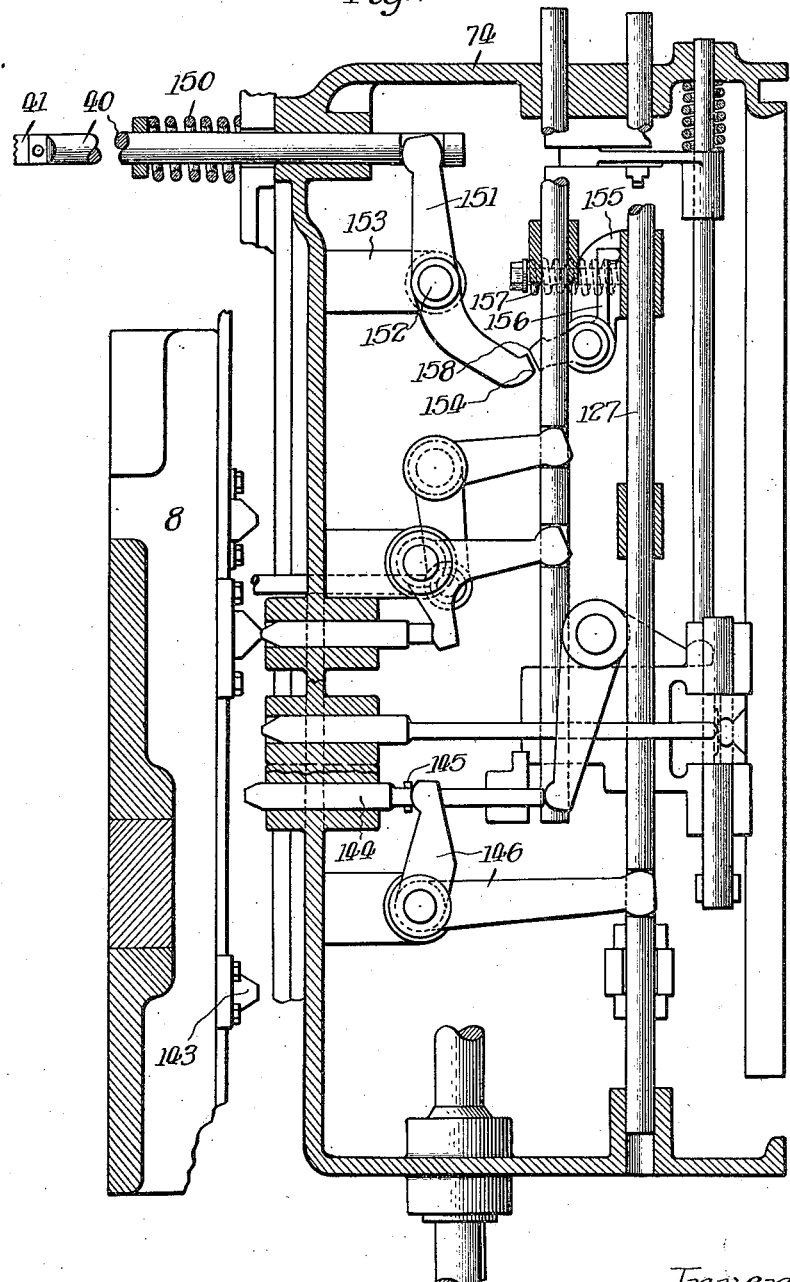

Feb. 12, 1924.
W. N. STEVENS
1,483,203
AUTOMATIC TABLE INDEXING AND LOCKING MECHANISM
Original Filed Aug. 26, 1921    5 Sheets-Sheet 5
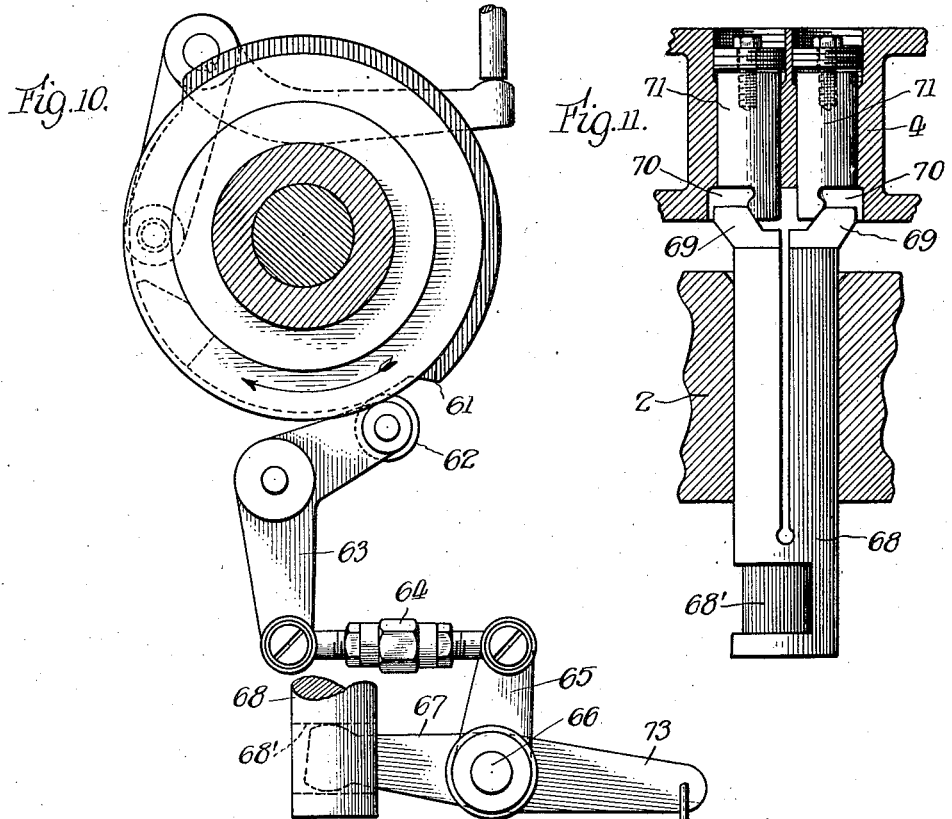
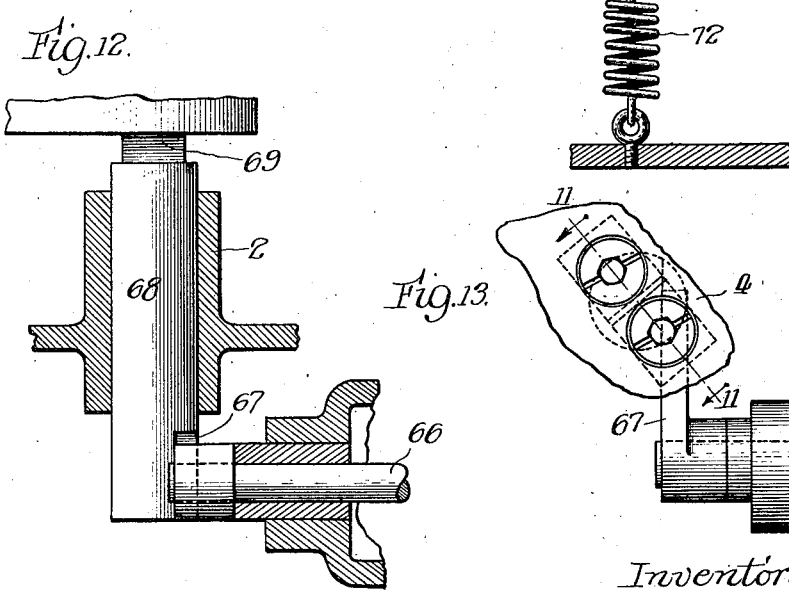
Witness:
A. J. Sauser.
Inventor:
William N. Stevens,
By Samuel N. Pond, Atty.

Patented Feb. 12, 1924.

1,483,203

UNITED STATES PATENT OFFICE.

WILLIAM N. STEVENS, OF MADISON, WISCONSIN, ASSIGNOR TO GISHOLT MACHINE COMPANY, OF MADISON, WISCONSIN, A CORPORATION OF WISCONSIN.

AUTOMATIC TABLE INDEXING AND LOCKING MECHANISM.

Original application filed August 26, 1921, Serial No. 495,707. Divided and this application filed October 3, 1922. Serial No. 593,165.

*To all whom it may concern:*

Be it known that I, WILLIAM N. STEVENS, a citizen of the United States, residing at Madison, in the county of Dane and State of Wisconsin, have invented certain new and useful Improvements in Automatic Table Indexing and Locking Mechanisms, of which the following is a specification.

This invention relates to improvements in automatic machine tools, and has reference more particularly to an automatic machine of the type employing one or more vertically reciprocating spindles, and a rotatable work holder carrying two or more chucks that are movable successively into and out of co-operative relation to the spindle or spindles by successive indexing movements of said rotary work holder. This application constitutes a division of an application filed by me on the 26th day of August, 1921, Serial No. 495,707, for an automatic machine tool, and the particular subject matter of the present application resides in the work table indexing and locking mechanism disclosed in the application hereinabove identified.

The machine illustrated in the accompanying drawings, and hereinafter described in detail to the extent of the mechanism forming the subject matter of the present application, is a two spindle machine having a circularly arranged group of four chucks or work holders, so that one chuck may be receiving a fresh piece of work and another chuck discharging a finished piece of work while the other chucks carry pieces that are being operated on by the spindle tools; but it will be understood that, so far as the work holder indexing mechanism is concerned, the number of spindles and chucks is immaterial.

The main object of the invention is to provide, in an automatic machine of the general character above indicated, a simple and improved automatic work table indexing and locking mechanism which shall be automatically tripped into action as the spindle (or the last spindle in the case of a multiple spindle machine) completes its upward or back traverse movement, and shall be automatically tripped out of action and relocked at the completion of the indexing movement.

In the accompanying drawings I have illustrated only so much of the complete machine disclosed in my aforesaid former application as is necessary to a full understanding of the structure and operation of the work table indexing and locking mechanism; and referring thereto, Fig. 1 is a substantially central front to rear vertical section of the complete machine, showing one of the two spindles and spindle slides and two of the four chucks or work holders;

Fig. 2 is a view partly in elevation and partly in vertical section of the indexing clutch drive; also showing the index trip and cocking mechanism;

Fig. 3 is an elevation of the index drive mechanism, partly in section on the line 3—3 of Fig. 2, and showing the locking pin cam, the cocking cam, and the index clutch throw-out cam.

Fig. 4 is an opposite end elevation of the index drive mechanism, partly in section on the line 4—4 of Fig. 2;

Fig. 5 is a sectional plan of parts of the indexing and cocking mechanism, taken on the line 5—5 of Fig. 2;

Fig. 6 is a fragmentary developed view of a single position engaging clutch on the indexing shaft;

Fig. 7 is an enlarged vertical section through the control box and adjacent spindle slide, showing in elevation the automatic trip mechanism for releasing the cocking shaft and throwing in the indexing clutch at the start of the table indexing movement;

Fig. 8 is a detail view showing in elevation the cocking mechanism at the upper end of the cocking shaft, and in section the upper bearing of the latter;

Fig. 9 is a horizontal section taken on the line 9—9 of Fig. 8;

Fig. 10 is a view in substantially the same vertical plane as Fig. 4, omitting the intermediate parts appearing in the latter figure and showing the cam and spring-actuated mechanism for operating the index locking pin;

Fig. 11 is a detail view in vertical section on the line 11—11 of Fig. 13;

Fig. 12 is a detail elevation of the index locking pin and part of its actuating mechanism; and Fig. 13 is a top plan of the parts shown in Fig. 12.

Figure 1:
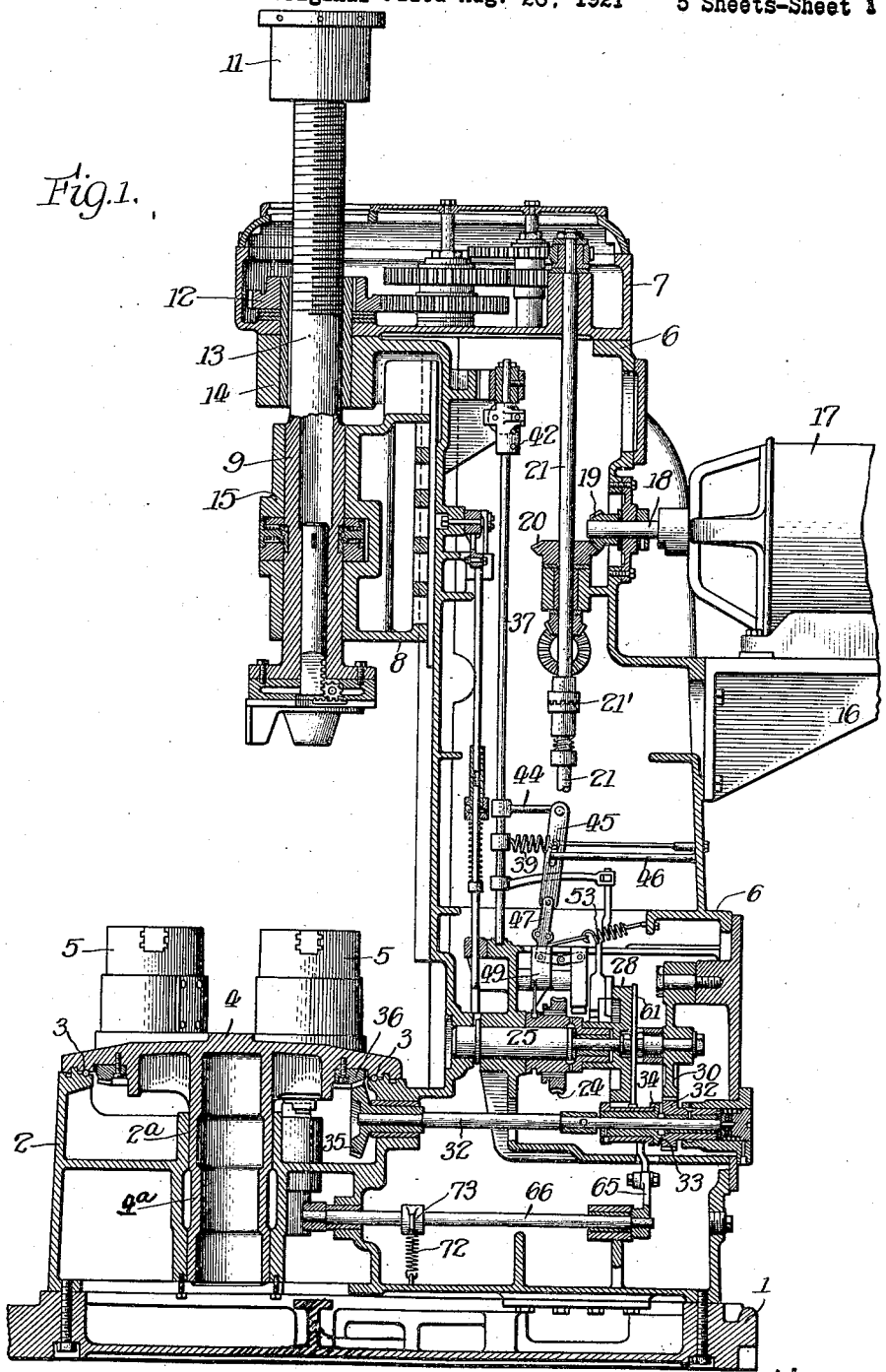

Referring to the drawings, 1 designates a base-plate or block on the front portion of which is a round bed 2, on which is rotatably mounted, preferably by anti-friction bearings 3 and a central vertical shaft or spindle $4^a$ turning in a bearing $2^a$ of the bed, a round work supporting table 4 having on its upper side a circular group of work supporting chucks 5, four in number in the particular machine herein shown, which is a two spindle machine.

At the rear of the bed 2 is an upright frame structure taking the general form of a vertical hollow casing or housing 6, on the upper end of which is a horizontal head box 7 containing the spindle driving gears.

Mounted in suitable slideways on the front of the vertical housing 6 are a pair of vertical slides 8, one of which is shown in Figs. 1 and 7; and in suitable bearings in these slides are mounted a pair of hollow spindles 9, disposed vertically above the rear pair of work holders 5, the lower ends of said spindles being adapted to receive tools for performing various operations upon castings held in the chucks 5. On the upper end of each spindle 9 is an adjustable spindle stop nut 11 which has a screw threaded engagement with the upper end of the spindle, and in the lowest position of the latter comes to rest on the upper side of a spindle driving gear 12, which latter is keyed to a sleeve 13 journaled in an upper bearing 14 of the frame directly beneath the head box and itself splined to the spindle 9. Below the upper bearing 14 spindles 9 are journaled in long bearings 15 formed on the front face of the vertical slides 8.

On the rear of the vertical housing 6 is a rearwardly extending bracket 16 (Fig. 1) supporting an electric motor 17 which supplies the power for operating the machine. The armature shaft 18 of the motor 17 carries on its inner end a bevel pinion 19 meshing with and driving a bevel gear 20 keyed on a central vertical drive shaft 21, which is journaled at its upper end in the head box 7, and from said upper end actuates the spindle driving gear trains. In the central vertical drive shaft 21 is preferably interposed a safety clutch 21', and on its lower end is a worm 23 (Fig. 4) driving a worm wheel 24 (Fig. 2) that is splined on a clutch member 26 slidably mounted on a horizontal shaft 25, which worm wheel 24, through clutch members 26 and 27 (Fig. 2) drives a crank disc 28, this latter, through a connecting rod 29 (Fig. 3) oscillating a pivoted sector gear 30. This latter meshes with and drives a pinion 31 that is loose on a horizontal index shaft 32 (Fig. 1), and is drivingly connected to the latter by a one-way clutch 33, 34 (Figs. 1 and 6). The worm wheel 24 is restrained against lateral movement by a stationary fork indicated at 24' engaged with a groove $24^a$ in the hub of the worm wheel. The index shaft 32 is journaled in the bed 2, as clearly shown in Fig. 1, and carries on its forward end a bevel pinion 35 driving a bevel gear 36 on the under side of the table 4. The sector gear 30 turns the index shaft 32 one revolution at each alternate swing, and this indexes the table from one station to the next.

Describing next the index clutch throwin and throw-out mechanism, 37 designates a vertical cocking shaft that is located in the central vertical front and rear plane of the machine and has fast thereon an arm 38 (Fig. 5), to the free end of which is attached a pull spring 39 tending to turn said shaft in the direction indicated by the arrow in Fig. 9. This cocking shaft, in the case of a two spindle machine, is normally held against turning by two trigger rods or catches 40 (Figs. 7 and 9) co-operating with a pair of pivoted catch levers 41 mounted on a block 42 carried by the cocking shaft and forced outwardly slightly, when the trigger rods or catches 40 are retracted, by push springs 42' mounted in the block 42 and pins 41' articulated to the catch levers 41. When both trigger rods 40 have been retracted in the manner and by the mechanism hereinafter described, the spring 39 turns the shaft 37. This, through an arm 43 fast on shaft 37, a link 44, and a pivoted vertical lever 45 mounted on a bracket arm 46 (Fig. 2), rocks an elbow lever 47 that is pivoted at its elbow at 48 to a forked clutch shifter 49 that is slidably mounted on a guide rod 50. The other arm of the elbow lever 47 is pivoted to a link 51 at 52, forming a toggle joint therewith. The breaking of this toggle joint upwardly permits the clutch shifter 49 which is engaged with the hub of the clutch member 26 to be drawn inwardly by a pull spring 53, thus connecting the clutch members 26 and 27, and starting the indexing movement through the mechanism already described. This release of the cocking shaft occurs only when the spindle (or the last spindle in a multiple spindle machine) has finished its work and returned to its upper or starting position. When this has occurred, a cocking cam 54 (Figs. 3 and 4) on the hub of the crank disc 28 strikes the lower end of a pivoted lever 55, and, through a link 56 and an arm 57 fast on the cocking shaft, rocks the latter back against the pull of spring 39 until it is caught and held by the catches 40, as shown in Fig. 9; the cooperating ends of the catches and trigger levers 41 being beveled as shown in Fig. 9 on their engaging sides, to effect such automatic relocking of the cocking shaft by the catches 40. This rocks the toggle lever back to the position shown in Fig. 2, which action, through the toggle arm 51 which is pivoted to a slide 58, throws a roller 59 on the lower end of said slide into the path of a throw-out cam 60 that is also carried by the hub of the crank disc 28; and this cam, striking the roller 59 on the slide 58, through the straightened toggle, retracts the clutch member 26 from the clutch member 27, thus unshipping the clutch and arresting the indexing movement.

In association with the above described mechanism for successively rotating the work table, I employ a mechanism for automatically locking the revolving table as it is turned to carry the work holders from each station to the next, this locking mechanism comprising the following parts. On the crank disc 28 is a cam 61 (Fig. 3) extending substantially half way around the disc, which cam, through alternate half revolutions of the disc, engages with a roller 62 carried by a pivoted elbow lever 63, the other arm of which lever is connected, through an adjustable link 64, with an arm 65 (Fig. 10) fast on a shaft 66. On the forward end of shaft 66 is an arm 67 which enters a socket 68' in the lower end of a split locking pin 68, said locking pin being slidably mounted in the bed 2 and at its upper end having a pair of tongues 69 entering recesses 70 in the lower side of the revolving table 4 and snugly engaged with said recesses through the agency of a pair of table-locating pins 71 designed to take up all lost motion and center and hold the table while locked rigid with the bed. The locking pin 68 is normally urged into locking engagement with the table through the pull of a spring 72 (Fig. 10), acting on an arm 73 fast on the shaft 66 and projecting in the opposite direction from the arm 67, so that the action of the cam 61 is to retract the locking pin just in advance of the indexing movement and hold it retracted during said movement, thus allowing the table to be indexed. The instant the recesses 70 come into register with the locking tongues 69, the cam 61 passes off the roller 62, and the spring 72 throws the tongues 69 of the locking pin 68 into full engagement with the recesses 70 of the table and the locating pins 71.

Describing next the mechanism for automatically tripping into action the table indexing and locking mechanism above described, by reference to Fig. 7 it will be observed that each of the trip rods or triggers 40, which, as shown in Fig. 9, operate to hold the cocking shaft 37 against turning under the pull of spring 39, is slidably mounted in a bearing in the back wall of a control box 74 mounted on one side of the main upright frame structure 6 laterally opposite the spindle slide 8, and is normally forced inwardly to engaging position with the elbow lever catch 41 by a spring 150. The outer end of each trip rod 40 is articulated to the upper end of a trip lever 151 pivoted at 152 on a bracket 153. The lower end of the lever 151 extends toward the front of the control box and is formed with an arrow point 154. Fast on a vertically slidable rod 127 extending through the control box is a bracket 155 on which is pivoted an elbow lever 156, the upstanding arm of which is pressed outwardly by a spring 157. The other rearwardly extending arm of lever 156 is formed with an arrow point 158 whose path of travel, as the rod 127 moves up and down, intersects the arrow point 154 of lever 151. On the outer edge of the spindle slide 8 is mounted an adjustable trip dog 143 which, as the slide on its back traverse or return movement approaches its fully raised position, strikes and forces outwardly a push rod 144 slidably mounted in the back wall of the control box. In the rod 144 is a cross-pin 145 which strikes one arm of an elbow lever 146. The other arm of said lever is articulated to the vertically slidable rod 127 which carries the bracket 155 on which the elbow lever 156 is mounted. As the rod 127 is thus moved downwardly, effecting the throw-out of the back traverse mechanism of the slide through means disclosed in my former application, above identified, the arrow point 158 wipes past the arrow point 154, thereby rocking the lever 151 and retracting the trip rod 40. This action occurs during the return movement of each spindle in a multiple spindle machine; but the cocking shaft is not released until the second or last trip rod is retracted on the return movement of the second or last spindle. This releases the cocking shaft, and trips in the table indexing movement through the mechanism previously described and set in action by the pull spring 39. During the return or upward movement of the rod 127, which is later effected by mechanism not herein described, the lever 156 idly passes the lower end of lever 151, the spring 157 permitting the lever 156 to rock on its pivot during such return movement.

Further explaining the action of the trigger rods 40 and catches 41 of the cocking mechanism, as used in a multiple spindle machine, when the rod 40 pertaining to the first, or any spindle except the last, to return is retracted through the mechanism last described, its catch lever 41, under the push of spring 42' swings outwardly slightly, so that, when the catch rod 40 returns under the thrust of spring 150 after the arrow point 158 has passed the arrow point 154, it abuts against the beveled end of the lever 41 but cannot relock therewith. However, when the cocking mechanism is reset through the action of the cocking cam 54, as hereinabove described, the beveled ends of the catch levers 41 wipe past the beveled ends of the trigger rods 40, and lockingly reengage with the latter.

It is believed that the foregoing description, taken in connection with the accompanying drawings, will make clear to persons skilled in this art the structural features and mode of operation of my improved automatic work table indexing and locking mechanism. I have herein shown and described one embodiment of the present invention which has been found in practice to function reliably and satisfactorily; but manifestly, in an indexing and locking mechanism of this character many changes and variations in the details of structure and mechanism will suggest themselves to machinists conversant with this type of machine tool, and may be substituted in the present mechanism without involving any change in its mode of operation or sacrificing any of the advantages which it possesses. Hence, I reserve all such variations and modifications as fall within the spirit and purview of the claims.

I claim:

1. In an automatic table indexing mechanism, the combination with an upright frame structure, and a bed, of a slide mounted to reciprocate vertically on said frame structure, a spindle carried by said slide, a table rotatably mounted on said bed and carrying work holders movable in succession to a position beneath said spindle, means, including a pair of normally separated clutch members, for turning said table, spring actuated means for coupling said clutch members, detent mechanism normally holding said coupling means inactive, means actuated by said slide on its return travel for retracting said detent mechanism, and means for automatically uncoupling said clutch members at the end of the indexing movement of said table.

2. In an automatic table indexing mechanism, the combination with an upright frame structure, and a bed, of a slide mounted to reciprocate vertically on said frame structure, a spindle carried by said slide, a table rotatably mounted on said bed and carrying work holders movable in succession to a position beneath said spindle, means, including a pair of normally separated clutch members, for turning said table, a cocking shaft, a spring tending to turn said cocking shaft, a detent mechanism normally locking said cocking shaft against turning, normally idle clutch coupling and uncoupling means spring-actuated in clutch-coupling direction and released by the turning of said cocking shaft, means actuated by said slide on its return travel for retracting said detent mechanism, and means for automatically uncoupling said clutch members at the end of the indexing movement of said table.

3. In an automatic table indexing mechanism, the combination with an upright frame structure, and a bed, of a slide mounted to reciprocate vertically on said frame structure, a spindle carried by said slide, a table rotatably mounted on said bed and carrying work holders movable in succession to a position beneath said spindle, means, including a pair of normally separated clutch members, for turning said table, a cocking shaft, a spring tending to turn said cocking shaft, a detent mechanism normally locking said cocking shaft against turning, normally idle clutch coupling and uncoupling means spring actuated in clutch coupling direction and released by the turning of said cocking shaft, means actuated by said slide on its return travel for retracting said detent mechanism, cam-actuated means for uncoupling said clutch members at the end of the indexing movement of said table, and cam-actuated means for returning said cocking shaft to locked position.

4. The combination, with a rotary work table, of mechanism for indexing said table comprising an index shaft geared to said table, a pinion loose on said shaft, a one-way clutch drivingly connecting said pinion to said shaft, a pivoted sector gear meshing with said pinion, and means for oscillating said sector gear.

5. The combination, with a rotary work table, of mechanism for indexing said table comprising an index shaft geared to said table, a pinion loose on said shaft, a one-way clutch drivingly connecting said pinion to said shaft, a pivoted sector gear meshing with said pinion, a crank disc having a pitman connection to said sector gear, and clutch controlled mechanism for rotating said crank disc.

6. In an automatic table indexing mechanism, the combination with a reciprocating spindle slide, and a rotary work table, of indexing mechanism for said table, comprising an index shaft geared to said table, a pinion loose on said shaft, a one-way clutch drivingly connecting said pinion to said shaft, a pivoted sector gear meshing with said pinion, a crank disc having a pitman connection to said sector gear, and mechanism, including a clutch, for rotating said crank disc, means controlled by said spindle slide for throwing in said last-named clutch to set in operation said indexing mechanism, and means for automatically throwing out said clutch at the conclusion of the indexing operation.

WILLIAM N. STEVENS.